Sept. 16, 1952  C. A. CHARBENEAU  2,610,392
HAIRCUTTING COMB
Filed Jan. 11, 1949
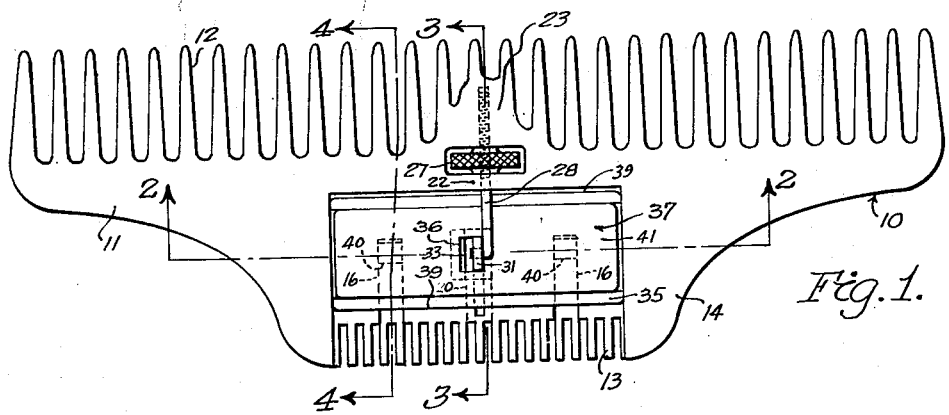
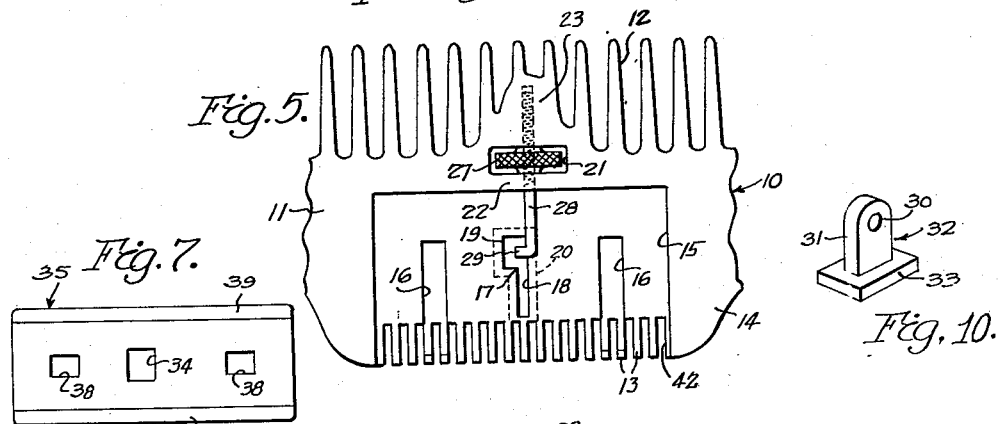
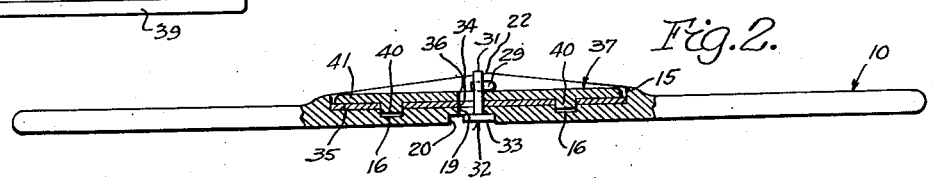
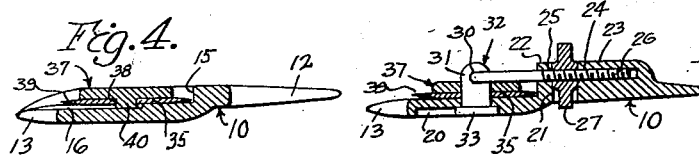 
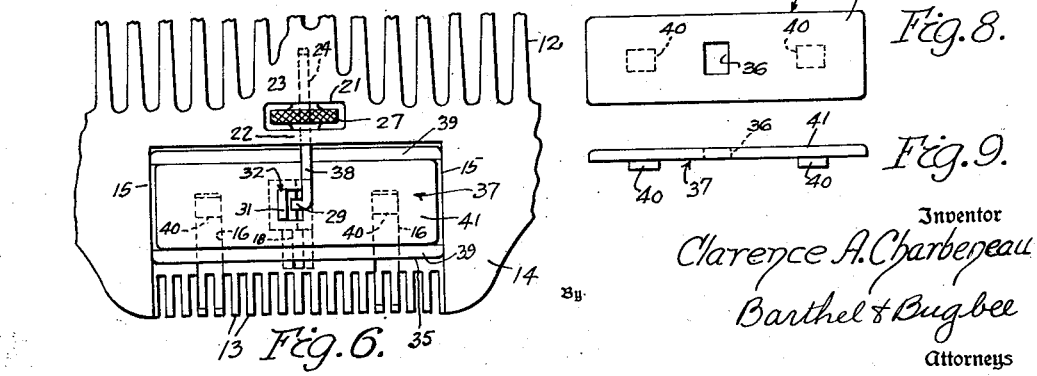
Inventor
Clarence A. Charbeneau
By Barthel & Bugbee
Attorneys Patented Sept. 16, 1952

2,610,392

UNITED STATES PATENT OFFICE 2,610,392

HAIRCUTTING COMB

Clarence Alois Charbeneau, Mount Clemens, Mich.

Application January 11, 1949, Serial No. 70,165

4 Claims. (Cl. 30—30)

This invention relates to hair-cutting devices, and in particular, to hair-cutting combs.

One object of this invention is to provide a hair-cutting comb having a cutting blade which is adjustable toward and away from the comb by minute and precise degrees, so that the cutting action of the comb may be accurately and precisely adjusted.

Another object is to provide a hair-cutting comb having a screw-operated adjustment device connected to the blade for moving the blade toward and away from the comb with which it is associated.

Another object is to provide a hair-cutting comb of the foregoing character having a screw-operated adjustment device which is quickly and easily detachable from the blade holder so that the blade may be changed rapidly with a simple operation.

In the drawings:

Figure 1 is a top plan view of a hair-cutting comb, according to a preferred form of the invention;

Figure 2 is a vertical longitudinal section along the line 2—2 in Figure 1;

Figure 3 is a vertical transverse section along the line 3—3 in Figure 1;

Figure 4 is a vertical transverse section along the line 4—4 in Figure 1;

Figure 5 is a fragmentary top plan view of the central portion of the hair-cutting comb of Figure 1, with the blade-holder and blade removed;

Figure 6 is a fragmentary top plan view of the central portion of Figure 1, showing the blade-holder retracted into the detaching position of the adjustment, ready for removal of the blade-holder and blade;

Figure 7 is a top plan view of a cutting blade used with the hair-cutting comb of Figure 1;

Figure 8 is a top plan view of the blade-holder used in the hair-cutting comb of Figure 1;

Figure 9 is a side elevation of the blade-holder shown in Figure 8; and

Figure 10 is a perspective view of the blade adjustment clip used in the hair-cutting comb of Figure 1.

Hitherto, in hair-cutting combs it has been difficult to control the cutting action of the cutting blade by reason of the fact that the blade was clamped roughly in position by a clamping nut or was moved roughly by a coarse rack and pinion. In the one case, when the clamping nut became loosened, the blade shifted its position and consequently altered its cutting action. In the other case, a slight pressure on the cutting blade or its holder pushed these in one direction or the other so as to alter the adjusted position of the blade and consequently to alter its cutting action. The present invention eliminates these difficulties by providing a precise screw-actuated adjustment which is fine in its adjustment and irreversible in operation, so that it can neither slip nor alter its adjustment unless the operator so desires.

Referring to the drawings in detail, Figure 1 shows a hair-cutting comb, generally designated 10, according to a preferred form of the invention as including a comb body 11 having hairdressing teeth 12 on one edge and cutting comb teeth 13 in a projecting portion 14 extending outward from the opposite edge of the comb body 11. Extending inward from the outer ends of the cutting comb teeth 13 is an approximately rectangular recess 15 containing a pair of elongated spaced parallel grooves 16 (Figure 5). Extending through the comb body 11 from the bottom of the recess 15 is an aperture 17 consisting of a slot 18 which at its rearward end opens into an enlarged hole 19. On the opposite or under side of the comb body 11 is an elongated groove 20 slightly larger than the aperture 17 and lying therebeneath.

Also extending through the comb body 11 rearwardly of the recess 15 is an aperture 21 separated from the recess 15 by a heightened bridge portion 22 (Figures 3 and 5) and having on its opposite side a heightened boss or ridge 23. Extending transversely through the bridge portion 22 and boss 23 is a bore 24 consisting of portions 25 and 26 within the bridge portion 22 and boss 23 respectively. Mounted in the aperture 21 is a thumb nut 27 engaged by the threaded portion of an L-shaped adjusting screw 28 passing through the bore 24.

The bent end 29 of the adjusting screw 28 is adapted to enter a hole 30 in the ear 31 of a clip (Figures 3 and 10), generally designated 32, having a rectangular base 33 which is adapted to slide to and fro in the groove 20. The ear 31 projects upward through the slot 18. The ear 31 also passes through a rectangular hole 34 in a cutting blade, generally designated 35 (Figure 7), and likewise through a rectangular hole 36 in a blade-holder, generally designated 37. The blade 35 also has a pair of spaced rectangular holes 38 on opposite sides of the hole 34, the latter being considerably wider than the thickness of the ear 31, so as to permit the latter to slide sidewise. The hole 36 in the blade holder 37 is likewise wider than the thickness of the ear 31, for the same purpose, as clearly shown in Figure 2. The blade 35 is provided with cutting edges 39 along its opposite edges. The blade-holder 37 is provided with spaced rectangular lugs 40 projecting downward from the underside of its plate-like body 41 (Figure 9), these being spaced so as to extend through the blade holes 38 into the grooves 16 (Figure 2). The body 41 and blade 35 are in the form of rectangular plates, the length of the blade 35 being such as to fit into the recess 15 with sufficient clearance so as to slide freely therein without excessive lost motion.

In the operation of the invention, with the blade-holder 37 removed as in Figure 5, to insert a blade, the blade 35 is placed in the forward portion of the recess 15 near the comb teeth 13, which are separated from one another by notches 42. The blade holder 37 is then pressed down upon the blade 35 with its lugs 40 passing through the holes 38. The assembly of the blade 35 and blade-holder 37 is then pushed rearwardly along the recess 15 until the aligned holes 34, 36 come into alignment with hole 19 in the position shown in Figure 6. The user then inserts the ear 31 of the clip 32 upward from below through the left-hand sides of the holes 19, 34, 36 until the top of the ear 31 with its hole 30 emerges above the top of the blade-holder 37, as shown in Figure 3. The clip 32 is then moved to the right from the position shown in Figure 6, to that shown in Figure 1, causing the hole 30 to move over the bent portion 29 of the screw 28. While holding the parts in this position with the fingers of one hand, the user rotates the thumb nut 27 to move the screw 28 forward, carrying with it the clip 32, blade 35 and blade-holder 37 until the ear 31 enters the narrow slot 18. The latter prohibits lateral motion, hence the clip 32 can no longer escape from its engagement with the bent portion 29 of the screw 28.

The user then applies the hair-cutting comb to his hair in the usual way, adjusting the cutting edge 39 of the cutting blade 35 toward or away from the outer ends of the teeth 13 by rotating the thumb nut 27 until the desired cutting action is obtained. The blade is changed by reversing the foregoing procedure, moving the clip 32 rearwardly by rotating the thumb nut 27 until it arrives within the aperture 19. In this position, it can be slid sidewise (Figure 6), detaching the ear 31 from the bent portion 29 of the screw 28. The clip 32 can then be dropped downward through the holes 36, 34, 19, releasing the blade 35 and blade-holder 37. These can then be slid forward toward the teeth 13 and out of the recess 15, and the blade-holder 37 lifted from the blade 35 so as to change the latter.

Thus, the invention provides a hair-cutting comb wherein the blade is adjustable by minute increments toward and away from the cutting comb teeth 13 merely by rotating the thumb nut 27. This blade, when once adjusted, maintains its adjustment because the screw 28 and nut 27 are non-slipping in their action. The blade 35 can be quickly changed, and a new blade substituted by a quick and simple procedure which does not interfere in any way with the normal use of the hair-cutting comb. The hair-dressing comb teeth 12 on the opposite side of the comb are used in the usual way.

What I claim is:

1. A hair-cutting comb comprising a comb body having an opening therein and hair-guiding teeth thereon and having a portion thereon adapted to slidably receive a cutting blade, a blade holder engageable with said blade and movable toward and away from said teeth, a blade-moving member engageable with said blade-holder, a screw engageable with said member, and a nut disposed in said opening and threadedly engaging said screw and effective upon rotation to adjustably move said screw, member and blade-holder to and fro relatively to said teeth, said screw having a bent portion engageable with said member, and said blade holder, blade and body having apertures receiving said member, one of said apertures guidingly engaging said member.

2. A hair-cutting comb comprising a comb body having an opening therein and hair-guiding teeth thereon and having a portion thereon adapted to slidably receive a cutting blade, a blade holder engageable with said blade and movable toward and away from said teeth, a blade-moving member engageable with said blade-holder, a screw engageable with said member, and a nut disposed in said opening and threadedly engaging said screw and effective upon rotation to adjustably move said screw, member and blade-holder to and fro relatively to said teeth, said screw having a bent portion engageable with said member, and said blade holder, blade and body having apertures receiving said member; one said apertures guidingly engaging said member, one of said apertures having a lateral enlargement at one portion thereof whereby to permit lateral shifting of said member to disengage said member from said screw.

3. A hair-cutting comb comprising a comb body having an opening therein and hair-guiding teeth thereon and having a recess therein adapted to slidably receive a cutting blade, a plate-like blade holder having a projecting portion engageable with said blade, a blade-moving member engageable with said blade-holder, a screw element mounted on said body and operatively connected to said member, and a nut element mounted on said screw element and disposed in said opening, one of said elements being rotatable relatively to the other element to adjustably move said blade-moving member to and fro relatively to said teeth, said blade-holder, blade and body having apertures receiving said member, one of said apertures guidingly engaging said member.

4. A hair-cutting comb comprising a comb body having an opening therein and hair-guiding teeth thereon and having a recess therein adapted to slidably receive a cutting blade, a plate-like blade holder having a projecting portion engageable with said blade, a blade-moving member engageable with said blade-holder, a screw element mounted on said body and operatively connected to said member, and a nut element mounted on said screw element and disposed in said opening, one of said elements being rotatable relatively to the other element to adjustably move said blade-moving member to and fro relatively to said teeth, said blade holder, blade and body having apertures receiving said member, one of said apertures guidingly engaging said member, one of said apertures having a lateral enlargement at its rearward end permitting lateral shifting of said member out of engagement with said screw.

CLARENCE ALOIS CHARBENEAU.

REFERENCES CITED

The following references are of record in the file of this patent:

UNITED STATES PATENTS

| Number | Name | Date |
|---|---|---|
| 1,236,926 | Gore | Aug. 14, 1917 |
| 1,448,341 | Graef | Mar. 13, 1923 |

FOREIGN PATENTS

| Number | Country | Date |
|---|---|---|
| 543,781 | France | June 9, 1922 |